Patented June 6, 1944

2,350,718

UNITED STATES PATENT OFFICE 2,350,718

PROCESS OF PREPARING ALPHA, BETA-DI-ALKYL-ALPHA, BETA-DIARYL-ETHANES

Hermann Bretschneider, Gábor Fodor, and Zoltán Földi, Budapest, Hungary; vested in the Alien Property Custodian No Drawing. Application December 11, 1939, Serial No. 308,726. In Hungary December 24, 1938

2 Claims. (Cl. 260—619)

The present invention relates to new products having oestrogenic activity and having the following general formula:

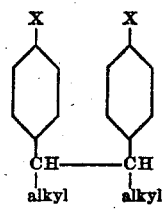

where X is a member of the group consisting of hydroxyl, alkoxy and acyloxy radicals.

A special type of these new products is represented by the following general formula:

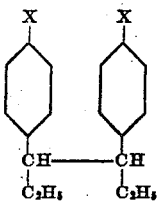

where X is a member of the group consisting of hydroxyl, alkoxy and acyloxy radicals.

A representative of these new products is shown in the following formula:

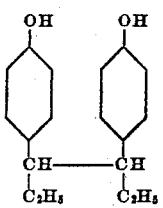

melting at about 185–187°. This product shows a very pronounced oestrogenic activity in the Allan-Doisy test on mice, even in doses as $0.1\gamma$. On account of the two asymmetric carbon atoms there are two stereo-isomers which correspond to the above formula. One of these stereo-isomers is the above mentioned one with the melting point of 185–187°. The other stereo-isomer melts at about 120°.

A further representative of the new product is the following one:

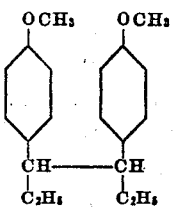

melting at about 143–144°. This substance exists, likewise, in another stereoisomeric form which melts at about 55°.

The present invention relates further to the intermediates of the following general formula:

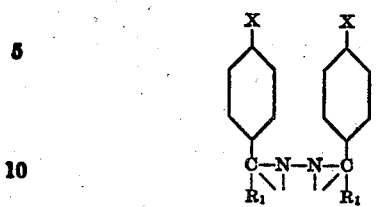

where X is a member of the group consisting of hydroxyl, alkoxy and acyloxy radicals and $R_1$ is an alkyl and where the adjacent two of the four free valencies form with each other a double bond, while the remaining two free valencies are bound to hydrogen atoms. Such compounds are the hydrazones of the following formula:

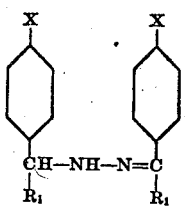

and the azo-compounds of the following formula:

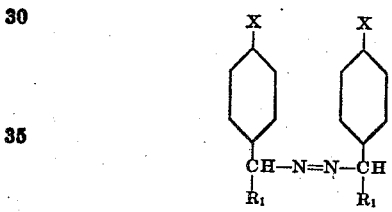

in which formula X and $R_1$ have the meaning as given above.

A further object of the present invention is to provide processes which lead to the products of the present invention. Such a process consists in subjecting to a thermic decomposition, compounds of the general formula:

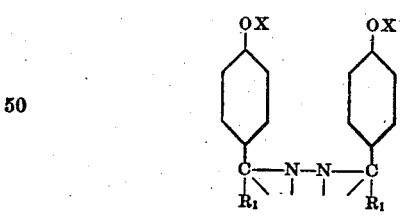

wherein X is a member of the group consisting of H, alkyl and aralkyl radicals $R_1$ is an alkyl and where two neighbouring of the four free valencies form a double bond, while the remaining two valencies are bound to hydrogen atoms. A variant of this process consists in subjecting to a thermic decomposition, compounds of the general formula:

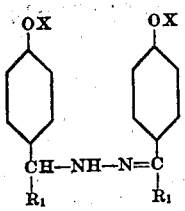

where X is a member of the group consisting of H, alkyl and aralkyl radicals and R₁ is an alkyl. A further variant of the above mentioned process consists in subjecting p,p'-alkoxy-α,α'-alkyl-azotoluols to a thermic decomposition.

One may further start from fatty aromatic ketazines containing in the aromatic ring a member of the group consisting of hydroxyl, alkoxy, acyloxy radicals and subjecting them to a catalytic hydrogenation and subjecting the hydrogenation product to oxidation and subjecting the product thus obtained to a thermic decomposition. Suitable fatty aromatic ketazines are the following ones:

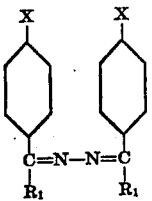

where X is a member of the group consisting of hydroxyl, alkoxy and acyloxy radicals and R₁ is an alkyl group; such an azino compound is shown in the following formula:

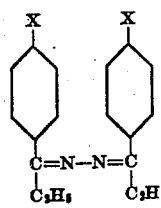

where X has the meaning as given above.

A further suitable ketazine is represented by the following formula:

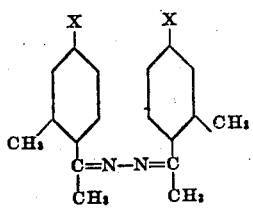

where X is a member of the group consisting of hydroxyl, alkoxy and acyloxy radicals.

One may start, further, from benzaldazines containing in the para positions alkoxy groups, subjecting them to the action of alkyl-magnesium-halogenides and subjecting the resulting product to a thermic decomposition. One may start, for instance, from anisaldazine, subjecting the same to the action of ethyl-magnesium-bromide and subjecting the product obtained to a thermic decomposition.

A special form of one of the above described processes consists in hydrogenating p-methoxy-propiophenonketazine in the presence of palladium as catalyst, subjecting the hydrogenating product to the action of a member of the group consisting of air and oxygen and separating from the oxidation products the two isomers of the empirical formula C₂₀H₂₆O₂N₂ and subjecting the same to a thermic decomposition.

A further object of the present invention is the step in preparing α,β-di-(p-oxy-phenyl)-α,β-dialkyl-ethanes in which step α,β-di-(p-alkoxyphenyl)-α,β-di-alkyl-ethanes are subjected to a dealkylating treatment.

The following give further details of the process.

The hydrogenation products of the ketazines seem to be extremely oxidizable, as the raw hydrogenation product contains without any special oxidative measures some oxidation product suitable to a thermic decomposition. It is, however, preferable to take certain measures for the oxidation which can be carried out by the simple action of air and oxygen. One may use copper sulfate as catalyst at this action of air or oxygen. The oxidation product, thus obtained, crystallizes and can be isolated in crystalline form. Two isomers result. Starting for instance from the ketazine of p-methoxy-propiophenone and hydrogenating it in the presence of palladium as catalyst and oxidizing the resulting product by air or oxygen, one may isolate two different compounds of the empirical formula of C₂₀H₂₆O₂N₂. One of the isomers melts at about 75–78°, the other at about 58–65°. One of the compounds has the hydrazino structure, whilst the other an azo structure. Both compounds give on thermic decomposition the same products which are free of nitrogen. One obtains namely two stereoisomers of the p,p'-dimethoxy-α,α'-diethyl-diphenyl-ethane. One of the stereoisomers melts at about 143°, the other at about 55°.

As the lower melting stereoisomer shows a smaller oestrogenic activity as shown by the higher melting stereoisomer, it is advantageous to transform the former into the latter. Thus a further object of the present invention is to provide for such processes. Technical measures which are generally used for racemisation have been found suitable for this transformation.

At the action of ethyl magnesium-bromide on anisaldazine one obtains the same compound (the empirical formula C₂₀H₂₆O₂N₂, melting point at 75–78°) as described above. This yields on thermic decomposition, likewise, the same stereoisomers melting at 143° and at about 55°, respectively. The di-(alkoxy-phenyl)-dialkyl-ethanes show a little, however an extremely protracted oestrogenic action. Treatment which leads to a dealkylation yield the di-(oxy-phenyl)-dialkyl-ethanes of a considerable higher oestrogenic activity. The dealkylation can be effected for instance by means of concentrated hydrobromic acid or by alcoholic potassium hydroxide.

The free phenols are suitable to be acylated yielding diacyl derivatives which show a protracted oestrogenic action. As acylating agents acetyl-chloride, propionyl-chloride, stearyl-chloride, benzoyl-chloride, acetic anhydride etc. can be used.

Further details of the invention are to be found in the following examples.

1. 4.5 grams of p-oxy-propiophenone-ketazine (free from solvent of crystallization; melting point at about 170°) are dissolved in 37 ccs. of absolute alcohol and hydrogenated at room temperature in the presence of 1.5 grams of charcoal containing 7–10% palladium. The absorption of hydrogen corresponds to about 2 mols. Now the mixture is filtered from the catalyst and evaporated to dryness. The residue is heated under reflux with 1.55 grams of palladium sponge (prepared secundum Willstädtter; see Berichte der deutschen Chemischen Gesellschaft, vol. 51, page 123) in a vacuum of 30 mms. at 100–110° bath temperature. A vigorous development of gases can be observed. The temperature is slowly raised to 200°. The decomposition products are now fractionated and the fraction distilling at about 160–190° in the vacuum from the mercury vapour pump is crystallized from chloroform or benzene. One obtains the γ, δ-di-(p-oxy-phenyl)-hexane with the melting point of 185–187°. Ultimate analysis shows the empirical formula of $C_{18}H_{22}O_2$. This product shows a pronounced oestrogenic action in the Allan-Doisy test on castrated mice, even in considerable smaller doses than 1γ.

The process is the same starting from the ketazine of the 2-methyl-4-oxy-acetophenone which ketazine melts at 252°.

2. 5 grams of p-methoxy-propiophenone-ketazine (melting at 133°) is hydrogenated at room temperature in an alcoholic suspension in the presence of palladium. When the absorption of hydrogen ceases (about 4 atoms of hydrogen are absorbed) the mixture is filtered from the catalyst, the filtrate is evaporated to dryness and the residue is distilled in the vacuum from the mercury-vapour pump, at about 90–100°. A vigorous development of gases can be observed. When it is finished the heating is continued. At 100–130° bath temperature one obtains a fraction which is crystallized from chloroform and afterwards from methanol. One obtains γ, δ-di-(p-methoxy-phenyl)-hexane which melts at about 144°. The ultimate analysis shows the empirical formula of $C_{20}H_{26}O_2$.

By heating this product with alcoholic potassium hydroxide at about 200° for some hours, one obtains in almost theoretical yield the free phenol melting at 185–187°, identical with the product described in Example 1.

3. 2420 grams of p-methoxy-propiophenone-ketazine are saturated by hydrogen as described in the preceding example. The alcoholic solution filtered from the catalyst is evaporated, in vacuo, to dryness at a temperature not exceeding 60°. The hydrogenation product obtained is spread on a large surface and allowed to stand in air for several days, while stirred occasionally. Slow crystallization occurs. After about three days the partly crystalline, partly oily mass is mixed with small amounts of ice-cold methanol and the crystals separated by suction. The methanol is evaporated from the mother liquor and the remaining oil is spread again on large surface and the same operations as described above are repeated till the amount of the oily parts becomes inconsiderable.

The crystalline product thus obtained does not show a sharp melting point. The melting points of the different fractions are between 45–55°. These crystals are, however, already suitable for the thermic decomposition. This crystal mass which consists mainly of two isomers can be, however, further purified by recrystallization, for instance from 2–2½-fold amount of methanol. One obtains, thus, still a mixture of the two isomers which melt, however, now at 55–62°. If a complete separation of the two isomers is aimed at, one may recrystallize the above mentioned product from methanol using in this case greater amounts of the solvent, and the solvent not being allowed to cool down to room temperature. The crystals separating at still lukewarm temperature are immediately isolated before the other isomer can begin to separate. On repeating these recrystallizations one may obtain one of the isomers with a melting point of about 76–78°, while from the mother liquors one may obtain the other isomer in a nearly pure form with a melting point of about 55–65°. Both isomers show the same elementary analysis, corresponding to the empirical formula of $C_{20}H_{26}O_2N_2$. Both are neutral to litmus. Both are extremely thermobabile. One of these isomers ought to correspond to the following hydrazino compound:

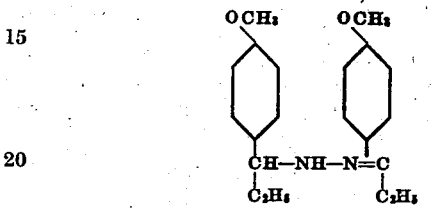

while the other isomer ought to correspond to the following azo compound:

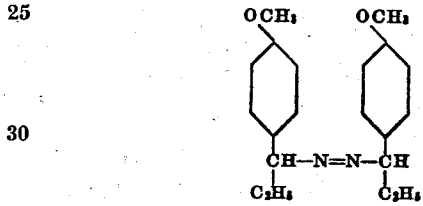

Both compounds are sensitive to aqueous hydrochloric acid. The product of the melting point 75–78° on dissolving in acetic ether containing 20% of dry hydrochloric acid, soon gives a crystalline precipitate in abundance.

The above described raw mixture of the two isomers can be subjected, without having been previously separated from each other, directly to a thermic decomposition. As the decomposition becomes at 133–135° already extremely vigorous and as it is very exothermic, one proceeds preferably as follows: 5 grams of the mixture are melted and heated with caution to 130–135°. If the decomposition begins to become too vigorous, the mixture is kept cool. When the decomposition becomes quiet, a further portion of 5 grams of the mixture is now added and heated again at 130–135°. Now the decomposition is moderated by the diluting action of the first decomposition products. The process is continued in the same way till 35 grams of the mixture have been decomposed. At the end of the decomposition the temperature is increased to about 180–200°.

Cessation of the nitrogen development indicates the end of this operation which lasts for about 10–15 minutes. If the decomposition is carried out in a $CO_2$ atmosphere, it is possible to measure the amount of the nitrogen development which is found to be nearly theoretical. On cooling, the decomposition mixture solidifies to a crystal mass. On addition of methanol and on suction one obtains about 12–13 grams of crystals melting at 143–144° and being the di-(p-methoxy-phenyl)-diethyl-ethane. One obtains from the mother liquors, by evaporating to dryness and by crystallizing the residue from about double the amount of methanol, the other stereoisomeric di(p-methoxy-phenyl)-diethyl-ethane, melting at about 55°. This product distils in the vacuo of the mercury vapour pump at about 105–115° bath temperature.

If it is intended to subject the pure separated isomers, instead of the raw crystal mixture obtained by the oxidation by means of air, to a thermic decomposition, one may proceed exactly as described above. It is, however, possible to proceed as follows: 2 grams of the product melting at 75–78° is distilled in the vacuo of the mercury-vapour pump. During the distillation a vigorous development of gases is to be observed. At 120–150° bath temperature one obtains a fraction which yields crystallized from methanol the di - (p-methoxy-phenyl) - diethyl ethane, melting at 143–144° in an amount of about 0.8 gram. The methanolic mother liquor contains the other stereoisomer melting at about 55°.

It is also possible to avoid the separation of the crystalline oxidation products resulting by the oxidation by means of air and to subject the raw oxidation mixture directly to the thermic decomposition. Thus, one obtains from 10 grams of the raw, partly crystalline, partly oily mixture about 2.5 grams of the product melting at 143°.

In order to transform the stereoisomer with the melting point of 55° into the other stereoisomer with the melting point of 143°, one may proceed preferably as follows:

2 grams of the dimethyl-ether (M. P. 55°) is mixed with 0.5 gram of charcoal containing about 20% of palladium and heated gradually in a slow stream of $CO_2$ atmosphere to 300° and kept at this temperature for six hours. After being cooled, the mixture is thoroughly exhausted by ether, the ether is filtered and evaporated to dryness. The residue is recrystallized from methanol. One obtains about 1 g. of the higher melting isomer with the melting point of 144°. From the methanolic mother liquor one may obtain about 0.7 gram of the unchanged starting material.

The demethylation of the product melting at 143–144° is already described in Example 2. The demethylation can be, however, carried out in the following way, too:

10 grams of the product melting at 143–144° is refluxed for about 2–3 hours in a mixture of 60 ccs. of glacial acetic acid and of 40–60 ccs. of aqueous hydrobromic acid of 66%; thus a clear solution is obtained. On cooling the mixture solidifies to a crystal pulp. It is now diluted by water and the crystals are filtered by suction and dried. For purification they can be extracted by hot chloroform or recrystallized from alcohol containing small amounts of water. Thus, di-(p-oxy-phenyl)-diethyl-ethane is obtained in almost theoretical yield. It may be distilled or sublimed in the vacuo of the mercury-vapour pump.

The demethylation of the stereoisomeric di-(p-methoxy-diphenyl)-diethyl-ethanes melting at 55° can be carried out in the same way. After the hydrolising, by means of hydrobromic acid, has been finished, the mixture on dilution with water deposits an oil which is taken up in ether. The ether is washed with water, evaporated to dryness and the residue is distilled in vacuo of the mercury-vapor pump. The free phenol distils at 160–170° bath temperature. The distillate recrystallized from methanol shows the melting point of about 108–114°.

The di-(p-oxy-phenyl)-diethyl-ethylene which is described in the literature and melts at about 170°, at the catalytic hydrogenation yields none of the ethane derivative melting at 185°, but the above mentioned stereoisomer with the lower melting point. On the contrary, the crystalline ethylene isomer which was unknown till now can be easily transformed by hydrogenation into the ethane derivative melting at 185°.

The di-(p-oxy-phenyl)-diethyl-ethane melting at 185–187° can be acylated, for instance, in the following way: 1.3 grams are dissolved in 5 ccs. of pyridine and 1.4 ccs. of propionyl chloride are added, drop by drop. After standing it is heated on the water bath, then cooled and diluted by water. The separating oil is taken up in ether, the ethereal solution is washed free from pyridine by means of diluted sulfuric acid of 5%, then washed with an aqueous sodium bicarbonate solution. The ether is evaporated to dryness and the crystalline residue is recrystallized from methanol. Thus, the dipropionate melting at 119–120° is obtained. In similar way one may obtain the di-stearate melting at about 63° or the diacetate melting at about 134–135°. The latter can, as well, be obtained by the action of acetic anhydride.

In the preceding example one may replace the p-methoxy-propiophenone-ketazine by other alkoxy-propiophenone-ketazones. Fatty aromatic ketazines which contain instead of the propionyl group an acetyl, butyryl, isobutyryl or diethyl-acetyl, etc., groups can be likewise used. The benzene ring can further contain other substituents, such as methyl or other alkyl groups, too. Such a starting material is for instance the ketazine of the 4-methoxy-2-methyl-acetophenone.

It is also possible to use ketazines containing free phenolic hydroxyl group. In this case one may proceed as given in the following example:

4. 11.8 grams of the ketazine of p-oxy-propiophenone are dissolved in 40 ccs. of twice normal sodium hydroxide and hydrogenated in the presence of 0.3–0.4 gram of palladium (precipitated on about 2 grams of charcoal) at room temperature. The absorption of hydrogen corresponds to about 2 mols. The mixture is now filtered from the catalyst and saturated by carbon dioxide and thoroughly exhausted with ether. The ethereal solution is cautiously evaporated to dryness. Temperatures rising above 40–50° are to be avoided. The amorphous residue is dissolved in 30 ccs. of benzol. On longer standing an abundant crystallization occurs. The crystals are filtered by suction, washed with benzol and with petroleum ether and dried at low temperature in a high vacuum.

2 grams of the aforementioned crystals are dissolved in 5 ccs. of absolute alcohol, cooled to —5° and a 0.2 normal iodine solution added in portions, till the color of the iodine remains. For this purpose about 47 ccs. of the following solution are needed: 6.35 grams of iodine and 10 grams of potassium acetate dissolved in 250 ccs. of absolute alcohol. The small surplus of iodine is now removed by sodium thiosulfate solution, then the mixture is poured in water and thoroughly exhausted with ether. The residue of the ethereal layer is recrystallized from benzol or a mixture of benzol-petroleum ether. The crystals obtained melt at about 130–150° under vigorous development of gas. These crystals do not reduce a methylalcoholic ammoniacal silver solution. A sample of these crystals yield, on methylation at room temperature by means of dimethyl-sulfate, the same crystals of the melting point of 75–78° and of the empirical formula $C_{20}H_{26}O_2N_2$, as described in the preceding examples.

The product melting at 130–150° with production of gas is now subjected at about 140° to a thermic decomposition. The amount of the produced nitrogen corresponds well to the theory. On cooling the decomposition mixture, crystallization occurs. The mixture is taken up in ether and washed with diluted sulfuric acid and with an aqueous sodium-bicarbonate solution and evaporated to dryness. One obtains di-(p-oxyphenyl)-diethyl-ethane which melts, after purification, at 185°.

5. From 7.52 grams of magnesium-ribbon and 24.6 grams of ethyl bromide in 350 ccs. of ether a solution of ethyl-magnesium-bromide is prepared. To this solution 10 grams of anisaldazine are added and refluxed for four hours, then the ether is evaporated and the residue is kept for three hours longer at 85–90°. A frothing of the mixture can be observed. Then the mixture is thoroughly cooled. Ether and then a mixture of ice and ammonium chloride are added, the ethereal layer separated, the aqueous layer repeatedly exhausted with ether, the united ethereal layers washed, then dried over sodium sulfate and evaporated to dryness. The remaining oil begins to crystallize on addition of 5 ccs. of methanol. It is now left to stand for a day in a cooling mixture, then filtered by suction and washed with cold methanol. One obtains about 2.5–3 grams of the product ($C_{20}H_{26}O_2N_2$, melting at 76–78°) described in the preceding examples. The thermic decomposition of this product yields the di-(p-methoxy-phenyl)-diethyl-ethanes described already.

The separating of the product melting of 76–78° in a crystalline state is, however, not necessary, as one may, likewise, subject the raw product itself which results after the addition of ice and ammonium chloride to the reaction mixture to the thermic decomposition.

In the above examples the experimental conditions can be varied in several respects without altering the scope of the invention.

In the specification all the temperatures are given in centigrade.

What we claim is:

1. A process for preparing $\alpha,\beta$-dialkyl-$\alpha,\beta$-diaryl ethanes consisting in subjecting azines of aliphatic-aromatic ketones having the general formula

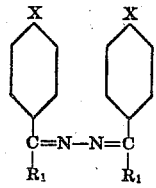

where X is a member selected from the group consisting of hydroxyl, alkoxy, and acyloxy radicals and is the same on each benzene ring, and $R_1$ is an alkyl group, to a catalytic hydrogenation, subjecting the hydrogenation product to oxidation, and subjecting the product thus obtained to a thermal decomposition.

2. A process as claimed in claim 1 in which the azino compounds of the aliphatic aromatic ketones have the general formula:

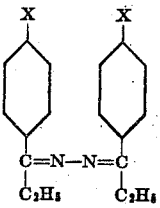

where X is a member of the group consisting of hydroxyl, alkoxy and acyloxy radicals and is the same on each benzene ring.

HERMANN BRETSCHNEIDER.
GÁBOR FODOR.
ZOLTÁN FÖLDI.